(12) United States Patent
Zittel

(10) Patent No.: US 11,951,370 B2
(45) Date of Patent: Apr. 9, 2024

(54) SPORTS APPARATUS

(71) Applicant: BOWNCE HOLDING PLC, Valletta (MT)

(72) Inventor: Vitalij Zittel, Constance (DE)

(73) Assignee: BOWNCE HOLDING PLC, Valletta (MT)

( * ) Notice: Subject to any disclaimer, the term of this patent is extended or adjusted under 35 U.S.C. 154(b) by 254 days.

(21) Appl. No.: 17/602,982

(22) PCT Filed: Apr. 14, 2020

(86) PCT No.: PCT/EP2020/060383
§ 371 (c)(1),
(2) Date: Nov. 5, 2021

(87) PCT Pub. No.: WO2020/212304
PCT Pub. Date: Oct. 22, 2020

(65) Prior Publication Data
US 2022/0176223 A1    Jun. 9, 2022

(30) Foreign Application Priority Data

Apr. 13, 2019   (DE) .................. 10 2019 002 702.7

(51) Int. Cl.
*A63B 69/30*    (2006.01)
*A63B 24/00*    (2006.01)
(Continued)

(52) U.S. Cl.
CPC .......... *A63B 69/30* (2022.08); *A63B 24/0062* (2013.01); *A63B 69/305* (2022.08);
(Continued)

(58) Field of Classification Search
CPC ... A63B 69/30; A63B 24/0062; A63B 69/305; A63B 71/0622; A63B 2214/00;
(Continued)

(56) References Cited

U.S. PATENT DOCUMENTS 4,534,557 A * 8/1985 Bigelow ................ A63B 69/32
                                                      482/84
5,554,088 A * 9/1996 Zlojutro ............... A63B 71/023
                                                      482/89

(Continued)

OTHER PUBLICATIONS

PCT/EP2020/060383 International Search Report dated Aug. 10, 2020.

*Primary Examiner* — Andrew S Lo
(74) *Attorney, Agent, or Firm* — Wagenknecht IP Law Group PC

(57) ABSTRACT

A sports apparatus comprising a boxing body, a boxing body receptacle, and a holding apparatus for holding the boxing body receptacle, wherein the holding apparatus and the boxing body receptacle are designed to hold the boxing body in a starting position, wherein the holding apparatus and the boxing body are designed such that the boxing body can be displaced, in particular elastically, out of the starting position by the action of a boxing punch, and is then returned to the starting position. The sports apparatus also comprises an output apparatus which is designed to selectively output user information to the user of the sports apparatus.

9 Claims, 3 Drawing Sheets

(51) Int. Cl.
    *A63B 69/20* (2006.01)
    *A63B 71/06* (2006.01)
(52) U.S. Cl.
    CPC ...... *A63B 71/0622* (2013.01); *A63B 2214/00* (2020.08); *A63B 2220/40* (2013.01); *A63B 2220/53* (2013.01); *A63B 2220/833* (2013.01); *A63B 2225/74* (2020.08)
(58) Field of Classification Search
    CPC ............ A63B 2220/40; A63B 2220/53; A63B 2220/833; A63B 2225/74; G09B 19/0038
    See application file for complete search history.

(56) References Cited

U.S. PATENT DOCUMENTS

| | | | | |
|---|---|---|---|---|
| 10,688,333 | B2* | 6/2020 | Guidicipietro | A63B 69/222 |
| 2004/0090011 | A1* | 5/2004 | Al-Harbi | A63B 69/30 |
| | | | | 273/317.1 |
| 2009/0176620 | A1* | 7/2009 | Reynolds | A63B 69/222 |
| | | | | 482/8 |
| 2010/0144414 | A1* | 6/2010 | Edis | A63F 13/816 |
| | | | | 482/8 |
| 2011/0159939 | A1* | 6/2011 | Lin | A63B 71/0605 |
| | | | | 463/8 |
| 2012/0108394 | A1* | 5/2012 | Jones | A63B 69/22 |
| | | | | 482/84 |
| 2012/0197418 | A1* | 8/2012 | Wilkes | A63B 69/32 |
| | | | | 700/91 |
| 2012/0238407 | A1* | 9/2012 | Dilworth | A61B 5/6895 |
| | | | | 482/8 |
| 2013/0065735 | A1* | 3/2013 | Conarty | A63B 69/20 |
| | | | | 482/89 |
| 2014/0248594 | A1* | 9/2014 | Navas | G09B 19/0038 |
| | | | | 434/247 |
| 2015/0360080 | A1* | 12/2015 | Hadaschik | G06Q 10/0639 |
| | | | | 73/865.4 |
| 2016/0059102 | A1 | 3/2016 | Williamson | |
| 2017/0087435 | A1* | 3/2017 | Jones | A63B 71/0622 |
| 2022/0176223 | A1* | 6/2022 | Zittel | A63B 69/305 |

* cited by examiner

SPORTS APPARATUS

TECHNICAL FIELD

The invention relates to a sports apparatus.

BACKGROUND OF THE INVENTION

Punching bags exist in a variety of configurations, such as heavy bags and double end bags. For example, an exemplary punching bag set can include a boxing body, a boxing body receptacle, and a holding apparatus for holding the boxing body receptacle. The holding apparatus and the boxing body receptacle are designed to hold the boxing body in a basic position. During the intended use, the boxing body is elastically displaced out of the basic position by the action of a boxing hit and is subsequently returned to the basic position.

SUMMARY OF THE INVENTION

It is an object of the present invention to improve the training effect and/or training experience in the use of such a sports apparatus.

According to the invention, the sports apparatus comprises an output device which is set up to output user information to the user of the sports apparatus, in particular selectively. The user information can include technical data of the apparatus, in particular status information of the apparatus, instructions (in particular action instructions) to the user and/or evaluation results. In addition to the unalloyed sports activity, the use of the sports apparatus now gains an interactive component which positively elevates the training experience.

The output device can comprise a mobile terminal, in particular a mobile telephone or a tablet PC. Application-specific software can be installed on the mobile terminal, in particular a so-called app by means of which the terminal device can be or is set up as an output device for the sports apparatus. In one embodiment, the sports apparatus comprises a measuring apparatus, which is designed to register a boxing hit on the boxing body using measurement technology, and to generate at least one measurement result therefrom. A measurement result can in particular be an indication of the impact intensity, the impact rate (in particular impact frequency) and/or the direction of impact. The measuring apparatus can comprise a sensor. Such a sensor can in particular include an accelerometer, by means of which in particular the above-mentioned information can be detected.

In one embodiment, the user information comprises a boxing instruction to the user, which describes a boxing hit to be executed. The boxing instruction represents an action instruction to the user. In this case, it specifies to the user how a boxing hit is to be executed. In this way, a training plan can be interactively provided to the user.

In one embodiment, the boxing instruction is compared with the measurement result to form an evaluation result. The evaluation result is output as user information. By linking the measurement result and the user information, in particular the boxing instruction, an assessment of the training success can be made and output as user information.

In one embodiment, the sports apparatus, in particular the measuring apparatus, comprises at least one or more of the following measuring devices:

A first measuring device, in particular comprising an accelerometer, on the holding apparatus and/or the boxing body receptacle. In this way, in particular, the intensity and/or direction of a boxing hit can be detected. The time of a boxing hit and thus the impact rate or impact frequency can thus also be measured.

A second measuring device, in particular comprising an accelerometer, on the boxing body, which is designed to detect the intensity and/or direction of a boxing hit. The time of a boxing hit and thus the impact rate or impact frequency can thus also be measured.

A third measuring device, in particular comprising a load sensor, in particular a force sensor, which is configured to detect a preload of the boxing body receptacle.

A fourth measuring device, which can be moved in a mobile manner, and in particular is not arranged on the holding apparatus, the boxing body, or the boxing body receptacle. This measuring device can comprise an accelerometer. The fourth measuring device can be attached, for example, to a first boxing glove. It can register the intensity and/or direction of a boxing hit, in particular with a first hand. In particular, such a further fourth measuring device, in particular comprising an accelerometer, can be provided which is attached to a second boxing glove to detect the intensity and/or direction of a boxing hit, in particular from the second hand of the user. Such a fourth measuring device can also be positioned at another location.

In one embodiment, the sports apparatus is configured to be operated in a sleep mode. In the sleep mode, the output apparatus is turned off and the measuring apparatus is on standby. Following a boxing hit, the measuring apparatus can turn on the output apparatus. This creates a simple possibility for switching on the sports apparatus, namely just by recording the use.

The boxing body can be designed differently and can be adapted in particular to the training requirements. The boxing body can, for example, be round or angular, in particular as a spherical or egg-shaped ball, and as PU leather.

BRIEF DESCRIPTION OF THE DRAWINGS

The invention is explained in more detail below with reference to the figures, wherein.

DETAILED DESCRIPTION OF PREFERRED EMBODIMENTS

Figure 1:
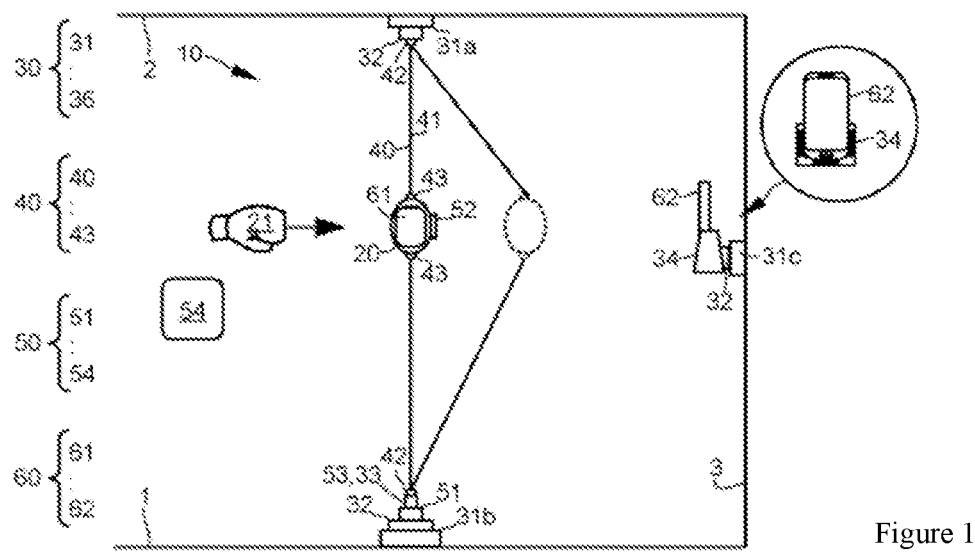
FIG. 1 is a sports apparatus according to the invention in a first embodiment in side view.

First, the embodiments of a sports apparatus according to the invention are described with reference to FIGS. 1-4 on the basis of their commonalities. The differences in the individual embodiments will be discussed below.

The present sports apparatus 10 can be used as a therapy, training and leisure device. The sports apparatus comprises:

a boxing body 20, a boxing body receptacle 40, in particular a boxing body suspension, for receiving, in particular suspending, the boxing body 20, a holding apparatus 30 for holding the boxing body receptacle 40, a measurement apparatus 50, and an output apparatus 60.

The boxing body 20 is in particular a so-called boxing ball which is held in a basic position (solid lines). The boxing body 20 is knocked from the basic position (broken lines) by a boxing hit from the person in training, who is wearing a boxing glove, for example; subsequently, the boxing body is automatically returned to the basic position.

The boxing body 20 is received by the boxing body receptacle 40, in this example a boxing body suspension. The boxing body receptacle 40 comprises, for example, an elastic receiving part 41, which in the present example is a stretchable rope 41.

The boxing body receptacle 40 comprises, at least at the top and bottom of the receiving part 41, in each case a first connection 42 for connecting the rope 41 to the holding apparatus 30.

The boxing body receptacle 40 comprises at least one second (here optionally two) connections 43 (here, rope connections) for the boxing body 20. The second connection 43 defines the position of the boxing body on the boxing body receptacle 40. In the present example, the rope 41 is guided through the boxing body 20. The two second connections 43 secure the position of the boxing body 20 in relation to the boxing body receptacle 40, in particular on the rope. The boxing body 20 can be arranged in different positions on the rope. In addition, the boxing body can also be removed and replaced as needed with another boxing body.

The boxing body 20 is clamped to the holding apparatus 30 by means of the boxing body receptacle 40.

The holding apparatus 30 comprises a plurality of fastenings 31.

A first upper fastening 31a is provided to secure the boxing body receptacle 40 at the top. A second, lower fastening 31b is provided to support the boxing body receptacle 40 at the bottom. A third, lateral fastening 31c is provided in order, for example, to fasten a mobile terminal 62 laterally.

At one of the fastenings 31, here between the lower fastening 31b and the boxing body receptacle 40, there is an adjustment unit 33 for setting a preload of the boxing body receptacle 40, in this example for adjusting the tension of the tensioning rope 41. In particular by extending or shortening the tensioning rope 41, its tension can be adjusted. The adjustment unit 33 being arranged at the bottom is preferred, since it is more accessible than that above.

The measuring apparatus comprises one or more measuring devices 51, 52, 53, 54.

A first measuring device 51 and a second measuring device 52 are each arranged on one of the fastenings 30a, 30, to which the boxing body receptacle 40 is attached. The first and second measuring devices 51, 52 are each designed to detect training data on the boxing body receptacle 40 and/or the holding apparatus 30. For this purpose, for example, accelerometers can be present with which conclusions regarding impact time, impact frequency and impact intensity can be generated.

A preload measuring device 53 is located on one of the fastenings as a third measuring device. In the present example, this preload measuring device is optionally integrated with the adjustment unit 33 for adjusting the preload.

A fourth measuring device 54 can be designed as a mobile measuring device. In particular, this can be arranged on the boxing glove 21, so as to generate information about impact time, impact frequency and impact intensity. In particular, it is also possible to produce a link with a striking arm (left or right arm) which was used. If the user makes use of two boxing gloves, a mobile measurement device 54 can be arranged on each of the boxing gloves; thus measurements and/or measurement values of individual boxing hits can be definitively assigned to a striking arm.

When the boxing body is set in motion by a boxing hit, the boxing body swings back and forth according to the intensity of the boxing hit.

The measurement devices collect data and transmit same to the evaluation unit, for example, which can be formed by the mobile terminal device with the app. Suitable evaluation software can be installed in the evaluation unit, in particular an app. The software is equipped with suitable measurement, analysis, data processing, and programing functions. In addition, the software can have access to all of the measurement devices of the measurement apparatus, in particular to the measurement device with which the preload of the boxing body receptacle is measured.

The output apparatus 60 comprises several output devices 61, 62. A first output device 61 can be attached to the boxing body 20 itself. Here it can be a group of signal elements; in the simplest case, such a signal element can visually represent boxing readiness to the user. A signal element can be an LED.

A second output device 62 can be arranged apart from the boxing body 20, and in particular also away from the boxing body receptacle 40. In the present example, the second output device 62 is a mobile terminal device 62, e.g., a mobile telephone or a tablet PC, in which an evaluation app is installed. The second output device 62 is secured via an appropriate holder 34 and the third fastening 31c, e.g., to a wall 3.

The four embodiments differ substantially from one another with respect to the holding apparatus 30.

In the embodiment according to FIG. 1, the boxing body receptacle 40 is secured to the floor 1 and to the ceiling 2 of a room.

Figure 2:
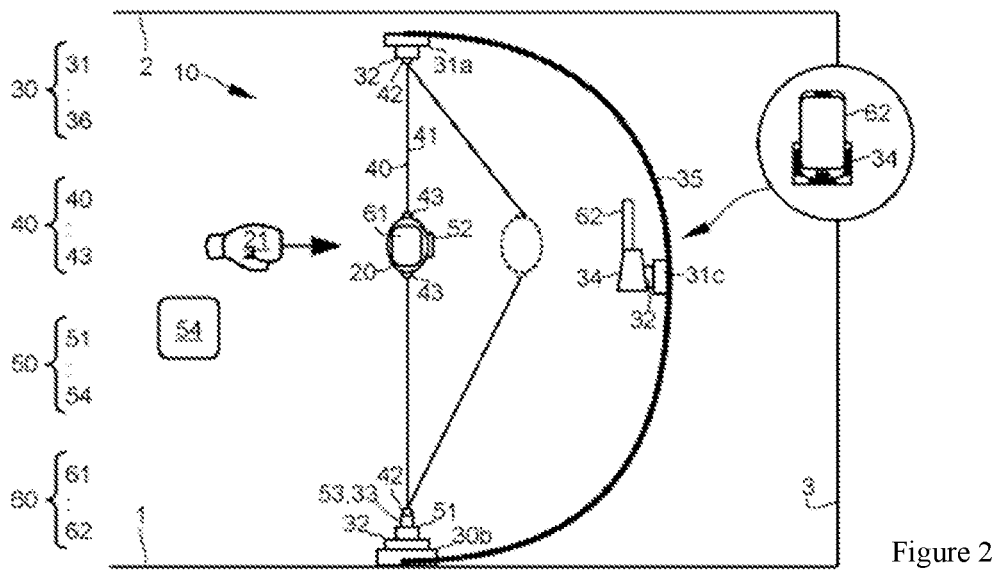
FIG. 2 is a sports apparatus according to the invention in a second embodiment in side view.

In the embodiment according to FIG. 2, the holding apparatus 30 comprises a holding frame 35, to which the upper and lower fastenings 31a and 31b are connected to fasten the boxing body receptacle 40. This holding frame 35 can be used independently of a room. In particular, the holding frame can be installed in the open or in a gymnasium, where no ceilings or side walls are available for fastening. The lateral fastening 31c can be connected to the holding frame 35 for the second output device 62.

Figure 3:
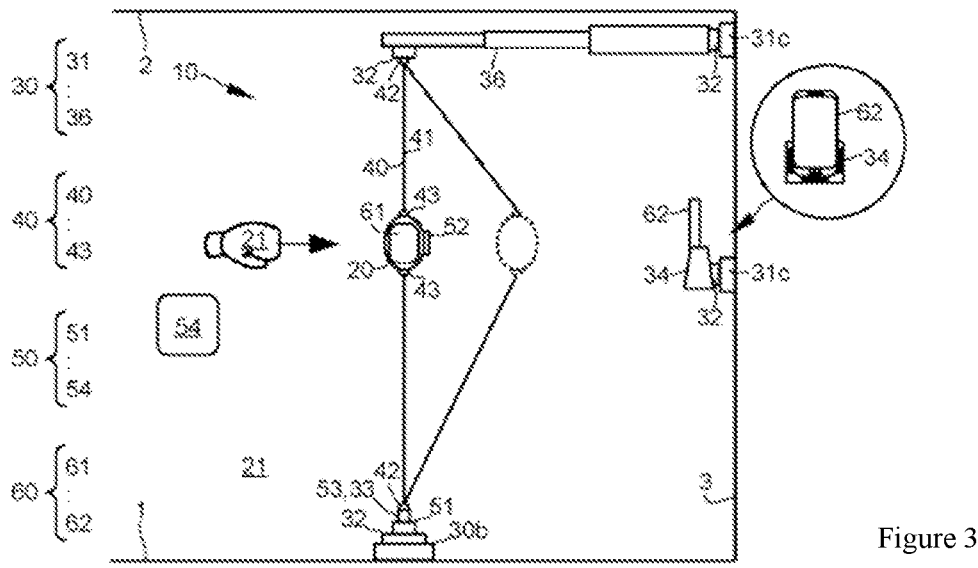
FIG. 3 is sports apparatus according to the invention in a third embodiment in side view.

In the embodiment according to FIG. 3, the holding apparatus 30 comprises a cross member 36. Via the cross member 36, an upper fastening 31a of the boxing body receptacle 40 can be connected to a lateral wall 3.

Figure 4:
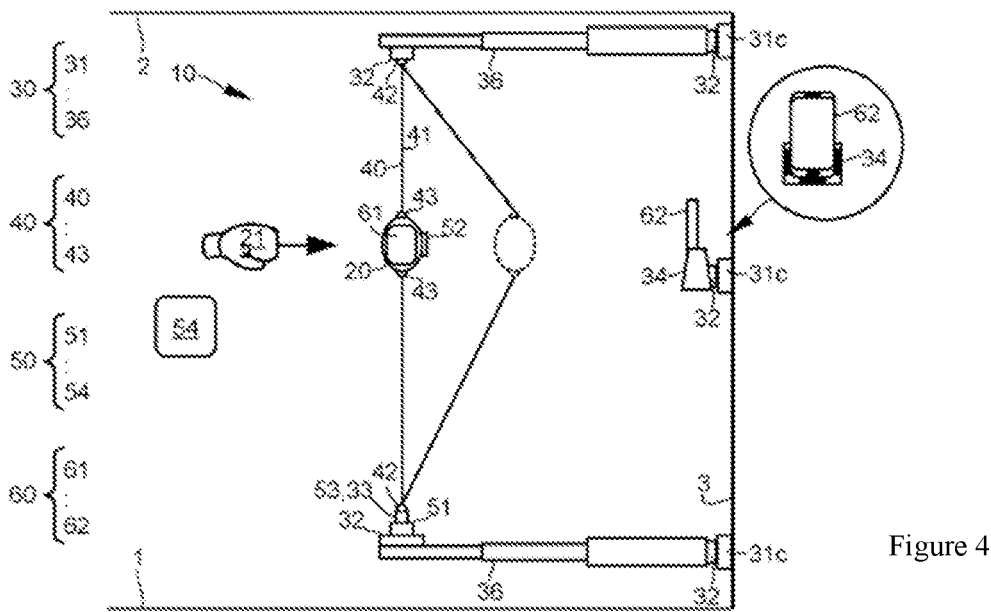
FIG. 4 is a sports apparatus according to the invention in a fourth embodiment in side view.

The embodiment according to FIG. 4 is based on the embodiment according to FIG. 3. The holding apparatus 30 comprises a further cross member 36. Via this cross member 36, a lower fastening 31b of the boxing body receptacle can be connected to a lateral wall 3.

The cross member 36 can be length-adjustable, in particular telescoping. For detachable fastening of individual components, at suitable points quick release fastenings 32 can be provided, in particular between the boxing body receptacle 40 and the holding apparatus 30 and/or between the holding apparatus 30 and the floor, the ceiling 2 and/or the lateral wall 3.

Figure 5:
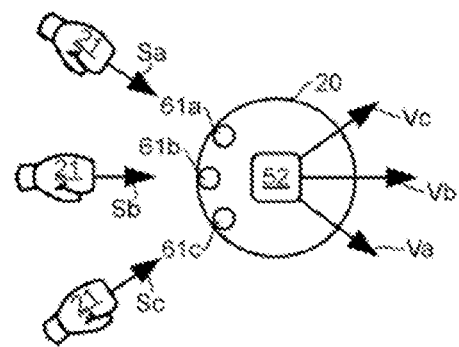
FIG. 5 is an embodiment of components of the measuring apparatus and of the output apparatus on the boxing body.

FIG. 5 shows the boxing body 20 from above in cross section. Separately controllable signal elements 61a, 61b, and 61c are arranged on the boxing body at different circumferential positions and represent position indicators, and thus a first output unit 61. For example, the signal elements 61a, 61b, and 61c can be individual LEDs. By controlling a signal element, it can be caused to light up and it can be conveyed to the user as user information that a boxing hit should now be executed such that the controlled position indicator is struck. For example, if the signal element 61a is activated, the boxing hit should be executed in the direction of the boxing hit vector Sa. Correct execution of the boxing hit can then be compared with reference to an acceleration vector Va, Vb, Vc, which, via a second measurement device attached to the boxing body (e.g., an accelerometer) is obtained as a measurement result. An evaluation result can be displayed on the mobile terminal device 62; the evaluation result can be represented as a degree of agreement of the actual boxing hit with the specification.

Figure 6:
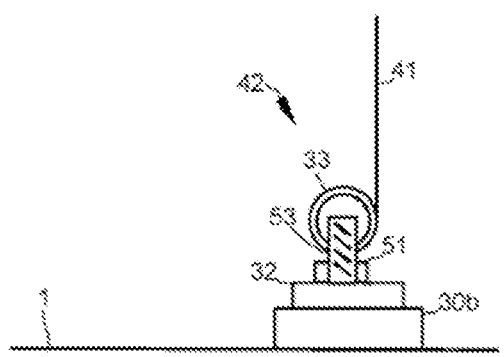
FIG. 6 is an embodiment of components of the measuring apparatus and of the holding apparatus in the region of a fastening.

FIG. 6 shows the sports apparatus 10 in the region of the lower fastening 31b. The rope 41 is wound on a motorized spindle 33 as an adjustment unit. Depending on the rotational setting of the spindle, different preloads of the rope 41 can be set. The spindle 33 is connected via a load cell 53 as a third measurement device to the lower fastening 31b; using the load cell 53, the preload of the rope 41 can be measured.

In one embodiment, the sports apparatus can remain in sleep mode. In this sleep mode, in particular the energy use is reduced to a minimum. In particular, the output device is turned off. The measurement apparatus can be on standby, however, and can register a boxing hit, in particular a spontaneously executed boxing hit using measurement technical devices, temporarily store the registered measurement results, and then transmit them to the output device after it is turned on. The measurement apparatus in this embodiment can turn on the output apparatus, in particular send a wake-up call, so to speak, to the output apparatus.

LIST OF REFERENCE SIGNS 1 floor
2 ceiling
3 wall (e.g., room wall, furniture wall)
10 sports apparatus
20 boxing body
21 boxing glove
30 holding apparatus
31 fastening
31a upper fastening (e.g., ceiling fastening)
31b lower fastening (e.g., floor fastening, ballast piece)
31c lateral fastening (e.g., wall fastening, furniture fastening)
32 quick-release fastening
33 preload adjustment unit
34 holder for terminal device 62
35 holding frame
36 cross member (e.g., telescopic)
40 boxing body receptacle, e.g., boxing body suspension
41 tensioning rope
42 connection to holding apparatus
43 connection to boxing body
50 measurement apparatus
51 first measuring device at the connection to the holding apparatus
52 second measuring device on the boxing body, e.g., accelerometer
53 third measuring device as a load measuring device
54 fourth measuring device on boxing glove
60 output apparatus
61 output unit on the boxing body
61a, b, c position indicators
62 mobile terminal
Va, b, c acceleration vector
Sa, b, c impact vector

What is claimed is:

1. A sports apparatus, comprising:
a boxing body;
a boxing body receptacle;
a holding apparatus for holding the boxing body receptacle;
a first measuring device comprising an accelerometer on the holding apparatus and/or on the boxing body receptacle, which is set up to detect the intensity and/or direction of a boxing hit;
a second measuring device comprising an accelerometer on the boxing body, which is set up to detect the intensity and/or direction of a boxing hit;
a third measuring device comprising a load sensor, which is set up to detect a preload of the holding apparatus and/or the boxing body receptacle; and
an output assembly set up to selectively output user information to a user of the sports apparatus;
wherein the holding apparatus and the boxing body receptacle are set up in such a way that the boxing body is held in a basic position, wherein the holding apparatus and the boxing body are set up in such a way that the boxing body acted upon by a boxing hit, can be displaced out of the basic position, optionally elastically and then is returned to the basic position.

2. The sports apparatus according to claim 1, characterized in that the output apparatus comprises a mobile terminal device.

3. The sports apparatus according to claim 1, characterized in that, the user information includes boxing instruction to the user, which describes a boxing hit to be executed by the user.

4. The sports apparatus according to claim 3, characterized in that the boxing instruction is compared with the measurement result to form an evaluation result, and that the evaluation result is output as user information.

5. The sports apparatus according to claim 1, further comprising a fourth measuring device comprising an accelerometer which is designed to be mobile and which is set up to detect the intensity and/or direction of a boxing hit.

6. The sports apparatus according to claim 5, characterized in that the fourth measuring device is arranged on a first boxing glove.

7. The sports apparatus according to claim 6, comprising another fourth measuring device comprising an accelerometer on a second boxing glove, which is set up to detect the intensity and/or direction of a boxing hit.

8. The sports apparatus according to claim 1, characterized in that the sports apparatus further comprises a sleep mode and the sports apparatus wakes from the sleep mode as a result of a boxing hit.

9. A method using the sports apparatus of claim 1, comprising coupling a mobile telephone or a tablet PC to the sports apparatus of claim 1, and hitting the boxing body.

* * * * *